United States Patent
Xu et al.

(10) Patent No.: US 6,391,436 B1
(45) Date of Patent: May 21, 2002

(54) MANUFACTURE OF VOID-FREE LAMINATES AND USE THEREOF

(75) Inventors: Guo Feng Xu, Irvine; Linas Repecka, Lakewood, both of CA (US); Steve Mortimer, Flintshire (GB); Steve Peake, Forest Hill, MD (US); Jack Boyd, Phoenix, AZ (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 09/315,064

(22) Filed: May 20, 1999

Related U.S. Application Data

(60) Provisional application No. 60/086,142, filed on May 20, 1998.

(51) Int. Cl.$^7$ ............................................. B32B 27/04
(52) U.S. Cl. ................. 428/298.1; 428/297.4; 428/298.7; 428/299.1; 428/299.7; 428/295.1; 428/293.4
(58) Field of Search ................. 264/510, 102; 428/116, 114, 295.4, 297.4, 298.1, 298.7, 299.1, 299.4, 299.7, 293.7, 293.4, 295.1

(56) References Cited

U.S. PATENT DOCUMENTS

| | | | |
|---|---|---|---|
| 4,311,611 A | * 1/1982 | Palmer | |
| 4,311,661 A | 1/1982 | Palmer | |
| 4,562,033 A | * 12/1985 | Johnson et al. | ............. 264/510 |
| 4,622,091 A | * 11/1986 | Letterman | |
| 4,652,319 A | 3/1987 | Hammond | |
| 4,915,896 A | * 4/1990 | Rachal | |
| 5,123,985 A | 6/1992 | Evans | |

FOREIGN PATENT DOCUMENTS

| | | |
|---|---|---|
| EP | 475 883 A2 | 3/1992 |
| EP | 583 090 A1 | 2/1994 |
| GB | 2 238 977 A | 6/1991 |
| JP | 4-251714 | 9/1982 |
| JP | 4-251715 | 9/1992 |

OTHER PUBLICATIONS

Juska, Thomas, et al., "An Evaluation of Low Energy Cure Glass Fabric Prepregs", Carderock Division Naval Surface Warfare Center, Sep. 1996, pp. 1–62.

Potts, A., "Low Temperature Future for Advanced Composites", British Plastics and Rubber, Nov. 1997, pp. 4–6.

Flake C. Campell, et al., "Porosity in Carbon Fiber Composites an Overview of Causes" Journal of Advanced Materials, Jul. 1995, pp. 18–33.

B. Thorfinnson, et al., "Degree of Impregnation of Prepegs—Effects on Porosity" 32nd International SAMPE Symposium, Apr. 1987, pp. 1500–1509.

(List continued on next page.)

*Primary Examiner*—Merrick Dixon
(74) *Attorney, Agent, or Firm*—Fitzpatrick, Cella, Harper & Scinto

(57) ABSTRACT

The invention provides a method of forming a void-free laminate, comprising the steps of:
(a) enclosing a partially impregnated prepreg in a vacuum envelope, said partially impregnated prepreg comprising a fiber layer partially impregnated with a resin composition; and (b) heating said partially impregnated prepreg under vacuum to withdraw air present in said partially impregnated prepreg and to cause said resin composition (i) to fully infuse into said fiber layer and (ii) to cure thereby forming said void-free laminate.

The present invention further provides novel combinations of modified epoxy resins that may be employed with the methods disclosed. The void-free laminates may be utilized for the manufacture of parts for the aerospace and aircraft industries.

14 Claims, 1 Drawing Sheet

OTHER PUBLICATIONS

Chris Ridgard, "Affordable Production of Composite Parts Using Low Temperature Curing Prepregs" Int'l Sampe Symp. 42, 1997, pp. 147–161.

B. Thorfinnson, et al., "Measurement and Control Prepreg Impregnation for Elimination of Porosity in Composite Parts" Society of Manufacturing Engineers Technical Paper, 1988, EM88–534 (1988).

B. Thorfinnson, et al., "Degree of Impregnation of Prepregs—Effects on Porosity", 32nd International SAMPE Symposium, Apr. 1987, pp. 1500–1509.

B. Thorfinnson, et al. "Production of Void Free Composite Parts Without Debulking" 31st International SAMPE Symposium, Apr. 1986, pp. 480–490.

* cited by examiner

MANUFACTURE OF VOID-FREE LAMINATES AND USE THEREOF

This application is a continuation-in-part and claims the benefit of U.S. Provisional Patent Application No. 60/086,142, filed May 20, 1998.

The U.S. Government has a paid-up license in this invention and the right in limited circumstances to require the patent owner to license others on reasonable terms as provided by the terms of contract No. F33615–95–2–5019 awarded by the United States Air Force.

BACKGROUND OF THE INVENTION

1. Field of the Invention

This invention relates to a method of manufacturing void-free laminates at low temperatures under autoclave-pressure or vacuum-bag-only-pressure. In particular, the invention relates to the use of partially impregnated prepregs in which the level of voidage in the resulting laminate is lower than that achieved by vacuum-bag-only-pressure techniques to-date.

2. Related Background Art

Composite materials consist of a matrix resin and reinforcement fibers. These materials are typically used in areas where high strength and low weight are important, for example, the aerospace and aircraft industries. Most composites used in aerospace structural applications comprise thermosetting resins and carbon fiber materials. Typically, these thermosetting resins are cured at high temperature (e.g., 250–350° F.) and under high pressure (e.g., 85 psi) using an autoclave.

A common method of manufacturing composite materials is to lay-up a number of sheets of uncured resin impregnated filaments called prepregs on a suitable tool and subject them to heat and pressure in order to coalesce the sheets, mold them to the configuration of the mold and subsequently gel the resin. The resin is then finally cured by further heat treatment in order to fix the resulting configuration of the molded laminate.

A major problem encountered in the manufacture of thick composite parts is porosity (or voids) in the final part. Although the occurrence of voids in composite materials is not completely understood, it is believed to be, in part, due to the fact that entrapped air cannot escape from the prepregs used in the manufacture of composite materials. Campbell et al. have studied the cause of porosity in carbon fiber composites (Flake C. Campbell et al., *Journal of Advanced Materials,* 18–33, Jul. 1995). Void formation and growth in composite laminates is primarily due to entrapped volatiles. Void growth will potentially occur if the void pressure (i.e., the volatile vapor pressure) exceeds the actual pressure on the liquid resin (i.e., the hydrostatic resin pressure) while the resin is still a liquid. Composite parts processed under similar conditions have been found to result in significantly different voidage levels resulting in production slowdowns. Void formation seriously compromises the mechanical properties of the composite material and in many cases requires large repair costs due to rejection of parts before they can be employed.

One way in which a void-free laminate can be manufactured is to utilize an autoclave. An autoclave is capable of subjecting the laid-up prepregs to elevated temperatures and pressures so that they can readily coalesce to form a reinforced composite material. This apparatus has the attraction of being capable of supplying sufficient pressure to the resin mass that hydraulic pressure within the mass causes a significant reduction in the size of enclosed gas or vapor bubbles or completely forces them into solution depending on the level of pressure applied. If the pressure is maintained during the gelation of the resin and its subsequent cure, a void-free matrix is achieved.

However, while pressure application from an autoclave is attractive in view of its potential for providing a void-free reinforced composite part, it is nevertheless expensive in view of the high capital cost of the equipment involved. Furthermore, autoclaving is deemed undesirable when the size of the reinforced composite part is too large to be efficiently cured in such a manner. Additionally, when making reinforced composite parts at low production rates, low cost tools made of wood or low glass transition temperature polymer tools are commonly used. When these tools are used, however, composite parts can only be cured using relatively low temperatures and pressures. Thus, the use of an autoclave is not practical in these circumstances.

A cheaper alternative to autoclaving is using a process in which the laid-up prepregs are placed on a tool and then enclosed by an impervious membrane. The volume enclosed by the membrane is evacuated and the assembly heated up slowly. Ambient atmospheric pressure provides the necessary force to coalesce the prepregs to form the molded laminate and the rising temperature rate ensures that the uncured resin is initially sufficiently mobile to permit maximum consolidation and to finally permit gelling and curing of the resin at more elevated temperatures.

While pressure application using a vacuum bag is more cost effective than employing an autoclave, the resulting laminate is usually of inferior quality because of the occurrence of voids in the resin matrix. The voids are trapped in both intralaminar and interlaminar areas. Normally, the center area of the laminate is most effected compared to the edge areas of the laminate. Typically, the minimum void level of a vacuum molded fiber reinforced composite material is from about 4 to about 6 percent by volume. The state of the current commercially available low temperature, (150° F.) vacuum-bag-only-pressure cure prepregs was reviewed. It was concluded that current technology does not permit formation of void-free unidirectional tape laminates by vacuum-bag-only-pressure and a 150° F. cure process (Chris Ridgard, Int'l SAMPLE Symp., 147–161, 1997).

Production of void-free laminates has been attempted using both bleed curing and net curing processes. In bleed curing some of the thermosetting resin is allowed to flow out of the prepreg, carrying out trapped air and volatiles (Flake C. Campbell, *Journal of Advanced Materials,* 18–33, July, 1995). Although this process can produce reduced void laminates after curing, the resin content is hard to control. Thus, the final composite material does not form a reliable and consistent part. This process usually results in the formation of a thin laminate having voids due to over-bleeding of the resin.

The opposite approach is taken in net resin curing, which is a non-bleed process. All the resin remains in the cured part, offering good control of the resin content, dimension and weight of the cured parts. However, in order to produce void-free laminates it is necessary to use autoclave curing to apply sufficient pressure to force any trapped air and volatiles out of the prepregs prior to curing.

An additional approach has been developed in order to produce laminates that minimize or have substantially zero void content. WO 98/38031 discloses a method of molding a composite comprising laying alternatively on a mold first and second fiber material pre-impregnated with uncured resin, the resin content of the first layer is different from that of the second layer, the layers are enclosed within an impervious membrane which is evacuated and heat is applied to partially cure the resin to harden the material. The partially cured material may be removed from the mold and finally cured at an elevated temperature while unsupported by a mold. Although, such a process may lead to a desired material having a low void content a number of disadvantages are present in a laminate produced in such a manner. Such a process employs a high resin content first prepreg layer with normal or relatively low viscosity resin and a low resin content second prepreg layer made with relatively toughened, high viscosity resin. As a result, the employment of two prepreg layers with resins having different characteristics leads to prepregs having different tack. This complicates handling of the prepregs and necessitates that the prepregs employed are registered properly in order to provide a laminate with the desired characteristics. Additionally, utilization of prepregs having resins with different viscosities may lead to additional complications since the viscosities of the resins during storage and/or during transportation may alter. Accordingly, different conditions may have to be controlled for each resin employed, leading to additional expense and effort, in order that the resins maintain their desired viscosity characteristics.

In view of the difficulties in preparing void-free reinforced composite materials it has been desired to develop a method that allows the consistent manufacture of a void-free composite material under vacuum-pressure and low temperature cure conditions. Such a method should provide means to control the resin content, dimension and weight of the cured parts for a fiber-reinforced resin composite. Such a method would also lead to significant cost savings since the quality of the laminate could be effectively controlled and expensive autocuring equipment would not be required. Furthermore, such a method would provide a consistent method to prepare void-free laminates for prototyping and tooling in the aerospace and aircraft industries which have desired mechanical strength and low weight.

SUMMARY OF THE INVENTION

The present invention relates to a method of forming laminates in which the level of voidage in the resulting laminate is less than about 2% and may be completely eliminated.

The present invention relates to a partially impregnated prepreg comprising a fiber layer partially impregnated with a resin composition, said resin composition when heated in a vacuum envelope fully infuses into said fiber layer and cures to form a void-free laminate.

The invention also provides a method of forming a void-free laminate, comprising the steps of:
(a) enclosing a partially impregnated prepreg in a vacuum envelope, said partially impregnated prepreg comprising a fiber layer partially impregnated with a resin composition; and
(b) heating said partially impregnated prepreg under vacuum to withdraw air present in said partially impregnated prepreg and to cause said resin composition (i) to fully infuse into said fiber layer and (ii) to cure thereby forming said void-free laminate.

The method may include the step of: positioning a second partially impregnated prepreg on said partially impregnated prepreg of step (a). It is within the scope of this invention to evacuate the vacuum envelope prior to heating the partially impregnated prepreg or to simultaneously heat the prepreg while evacuating the envelope.

In a preferred embodiment the resin composition is a semi-solid at room temperature and is a liquid at cure temperatures with a viscosity from about 100 to about 1200 poise.

The invention also provides a resin composition comprising:
(a) from about 70 to about 90 weight percent of a tris(hydroxyphenyl)methane based epoxy semi-solid resin; and
(b) from about 10 to about 30 weight percent of a tetraglycidylmethylenedianiline liquid resin.

The invention further provides a resin composition comprising:
(a) from about 45 to about 65 weight percent of a glycidyl ether of phenolic novolac resin;
(b) from about 5 to about 20 weight percent of a bisphenol A epoxy semi-solid resin; and
(c) from about 10 to about 30 weight percent of a bisphenol A epoxy liquid resin.

The invention also provides a resin composition comprising:
(a) from about 20 to about 30 weight percent of a glycidyl ether of cresol novolac resin;
(b) from about 35 to about 45 weight percent of a tetraglycidylmethylenedianiline resin;
(c) from about 14 to about 26 weight percent of a bisphenol A epoxy liquid resin; and
(d) from about 0 to about 8 weight percent of a bisphenol A epoxy solid resin.

One preferred resin composition of the present intention comprises:
(a) from about 20 to about 30 weight percent of

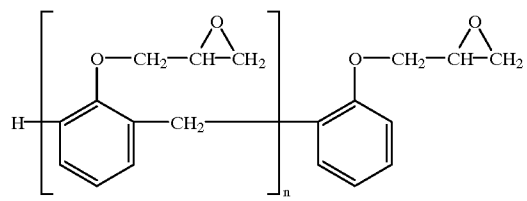

wherein n is 2.8;
(b) from about 35 to about 45 weight percent of

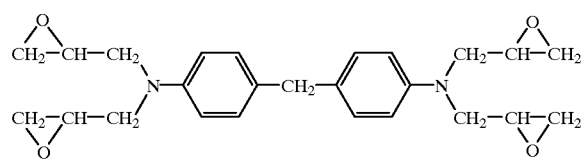

(c) from about 14 to about 26 weight percent of

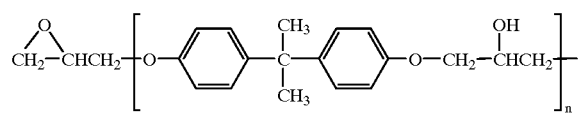

-continued

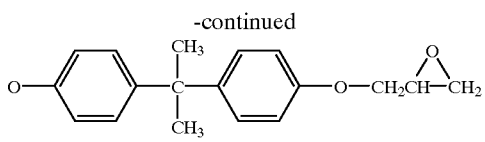

wherein n is 2.5; and (d) from about 0 to about 8 weight percent of

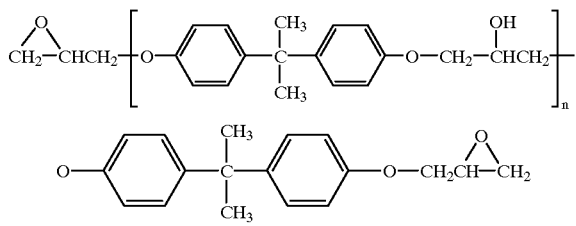

wherein n is 30.5.

The invention also provides a method of forming a void-free laminate, comprising the steps of:

(a) enclosing a partially impregnated prepreg in a vacuum envelope, said partially impregnated prepreg comprising a fiber layer partially impregnated with a resin composition, said resin composition comprising a glycidyl ether of cresol novolac resin; and (b) heating said partially impregnated prepreg under vacuum to withdraw air present in said partially impregnated prepreg and to cause said resin composition (i) to fully infuse into said fiber layer and (ii) to cure thereby forming said void-free laminate.

Alternatively, the method of forming a void-free laminate could be formed by substituting the resin composition comprising a glycidyl ether of cresol novolac resin with any of the other resin compositions described above.

The void-free laminates prepared according to the present invention method may be employed to form reinforced composite materials for use in areas where high strength and low weight are important, for example, in the aircraft industry.

BRIEF DESCRIPTION OF THE DRAWING

The foregoing objects and many of the attendant advantages of this invention will become more readily appreciated as the same becomes better understood by reference to the following detailed description when taken in conjunction with the accompanying drawing wherein a side-sectional view of a lay-up of a multi-component vacuum-bag-only-pressure having a partially impregnated prepreg on the tool surface.

DETAILED DESCRIPTION OF THE INVENTION

Figure 1:
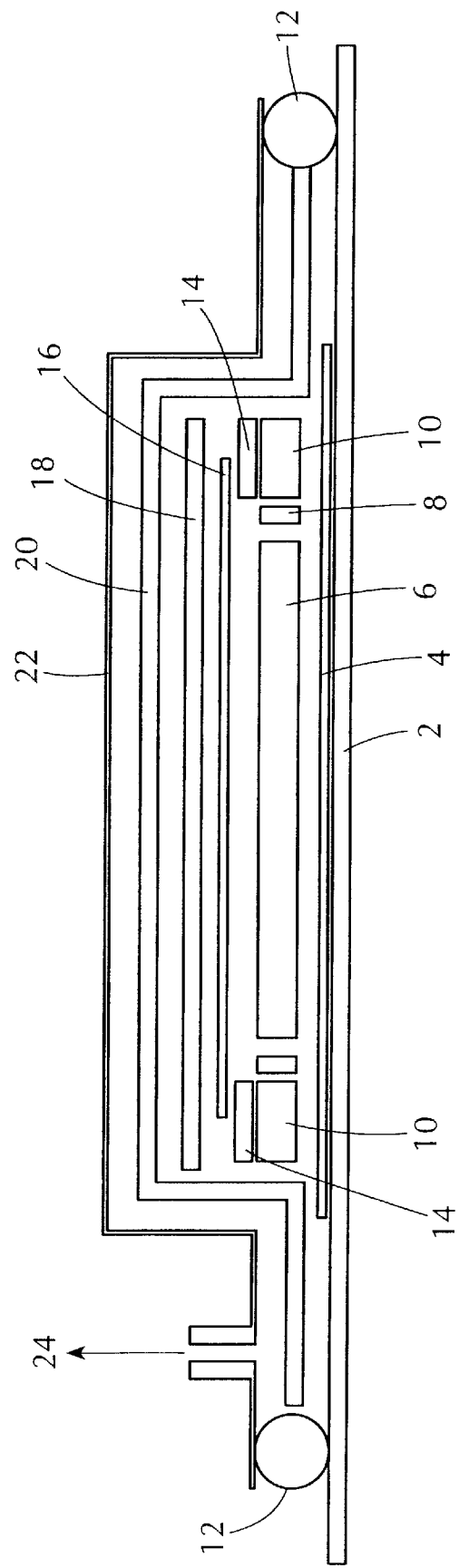

As employed herein the term "laminate" is defined as cured fiber reinforced resin composite material.

As employed herein the terms "fiber layer" and "fabric layer" are used interchangeably.

As employed herein the phrase "fabric bulk density" refers to the volume that the unimpregnated fabric occupies divided by its mass.

As employed herein the term "void-free laminate" is defined as a laminate in which the level of voidage is less than about 2% and more preferably less than about 1%.

Voidage is determined using standard examination techniques well-known to those skilled in the art, such as ultrasonic inspection (a pulse echo reflector plate C-scan) and photomicrographs of the laminate cross sections.

As employed herein the phrase "partially impregnated" refers to introducing a resin film, powder and/or liquid into the interstices of a suitable substrate, such as a fiber layer, by application of heat and/or pressure or the like to form a partial resin matrix in the interstices of the substrate. Typically, the resulting partially impregnated prepreg contains a resin loading from about 25% to about 50% by weight based on the total weight of the resin and substrate.

Partially impregnated prepregs are made by partially impregnating a fabric layer with a resin composition by applying heat and pressure in a continuous process. Preferably, the resin composition is first formed into a film with the required thickness by heating the resin composition from about 140° F. to about 160° F. The hot resin is then coated onto a release paper using a roller coater or blade-over-plate coater. The resin now in the form of a single continuous film is laid on a fabric layer. The resin is hot pressed into the fibers at 140° F. to about 200° F. The impregnation is controlled so that there are sufficient dry fibers in the middle of the prepreg. Alternatively, the resin may also be applied to the fabric layer in the form of a powder, and, under application of heat and pressure (such as "ironing"), partially impregnated into the fabric layer.

Many conventional methods to partially impregnate resins into fabric are known to those of ordinary skill in the art, for example, in the case of resin films, a laminator process. In the case of a powder resin, the Pherostatic™ coating process of Electrostatic Technology Inc., New Haven, Conn. may be employed. This is an electrostatic process in which charged powder particles are attracted to a substrate as it passes through the Pherostatic™ coating machine resulting in a uniform coating of dry powder. The substrate is conducted near a heat source directly above the coater where the powder melts and forms a homogeneous film over the substrate.

Liquid resins may also be employed in the manufacture of the partially impregnated prepregs. A liquid resin may, for example, be poured over a fabric layer, allowed to cool to form a film and then heated under pressure to partially impregnate the film into the fabric layer. Generally, one face of the fabric layer is partially impregnated with a resin composition. Preferably, both the top and bottom faces of fabric layer(s) are partially impregnated when preparing the partially impregnated prepreg.

The partially impregnated prepregs have dry fibers in the middle of the prepreg which provide escape paths through which entrapped air and/or other volatiles in the prepreg may be removed when a vacuum is applied to the laminate. Partially impregnated prepreg is also referred to as thick laminate prepreg ("TLP"). In accordance with the invention, a lay-up is created with a partially impregnated prepreg or by stacking a plurality of partially impregnated prepregs together. The orientation of the various layers in a stack of partially impregnated prepregs is based on the desired directional strength of the resulting structure. Optionally, the partially impregnated prepreg or the stack of partially impregnated prepregs are stitched together in the cross-ply direction.

Curing of the partially impregnated prepreg or a stack of partially impregnated prepregs may be conducted by vacuum bagging methods at low temperatures. Such curing methods are well-known to those of ordinary skill in the art.

In a preferred embodiment as illustrated in U.S. Pat. No. 4,622,091 a partially impregnated prepreg or a stack of partially impregnated prepregs are enclosed by a resin content control envelope through which a conduit passes, such as breather tape. The resin content control envelope is, in turn, enclosed by a vacuum envelope. Air and other gases are withdrawn via the envelopes. Thereafter, the composite is heated. As the resin enters the partially impregnated prepreg(s), air and other gases remaining in the partially impregnated prepreg(s) are withdrawn via the conduit created by the fibers that form the partially impregnated prepreg(s) and the breather tape.

Preferably, the partially impregnated prepreg(s) is located on a tool, which may form part of the vacuum envelope. The tool may be separated from the partially impregnated prepreg(s) by a release film, which then forms part of the resin content control envelope. The tool molds the adjacent surface of the fiber reinforced resin composite as it is being formed.

In accordance with another aspect of this invention, a second tool may be located on the other side of the partially impregnated prepreg(s) from the first tool used to mold the opposed surface of the fiber reinforced composite structure as it is being formed. The second tool can be separated from the upper resin layer by a release layer.

In accordance with further aspects of this invention, a center core formed of wood, foam, honeycomb or the like may be located between layers of partially impregnated prepregs. Alternatively, or in addition, doubler layers may be located on one side of the partially impregnated prepreg to create elongated reinforcing regions. Such embodiments are illustrated in U.S. Pat. No. 4,622,091.

Preferably, the void-free laminates of the present invention are prepared using a process in which the laid-up partially impregnated prepreg(s) is placed on a tool and then enclosed by an impervious membrane, i.e., vacuum-bag-only pressure. The volume enclosed by the membrane is evacuated and the assembly heated up slowly. Ambient atmospheric pressure provides the necessary force to coalesce the prepreg(s) to form the molded laminate and the rising temperature rate ensures that the uncured resin is sufficiently mobile to permit maximum consolidation and to finally permit gelling and curing of the resin at more elevated temperatures.

Alternatively, another way in which a void-free laminate of the present invention can be manufactured is to utilize autoclave-pressure. An autoclave is capable of subjecting the laid-up partially impregnated prepregs to elevated temperatures and pressures so that they can readily coalesce to form a reinforced composite material.

Each reinforced fabric layer is formed of a plurality of reinforcing and/or supporting continuous fibers. The fibers may be in any conventional form, such as unidirectional, woven fabric, knitted fabric, swirl mat, felt mat, wound, braided, and the like. The fiber reinforcing material may be glass, quartz, organics such as KEVLAR® brand polyamide, carbon, graphite and the like.

When unidirectional tape is used, each layer is formed of a plurality of parallel oriented tows. A tow is a loose, essentially untwisted strand of a large number of unidirectional reinforced synthetic fibers. Each tow may comprise, for example, 1,000, 3,000, 6,000, 12,000, 24,000, 48,000, 56,000 or 125,000 fibers or the like. The tows may be loosely held in position by cross-tow stitches or by a small amount of resin such as a thermoplastic resin. The tows may also be held together by weft-insertion knitting stitches.

The orientation of the layers is based on the desired directional strength of the resultant fiber reinforced resin composite. As is conventional, some layers lie parallel to a predetermined direction, which is usually the direction of the major force likely to be applied to the resultant monolithic structure. Layers whose tows lie in this direction are commonly referred to as 0° layers. Other layers lie at an angle to the 0° layer. Normally the axis of the tows of some layers lie orthogonal to the tow direction of the 0° layer. These layers are commonly referred to as 90° layers.

Layers whose tows lie at some other angle with respect to the direction of the tows of the 0° layers are referred to as + and − layers. Most commonly, the tows of these layers form +45° and −45° angles with respect to the direction of the tows of the 0° layers. The number of 0°, 90°, + and − layers and how they are interleaved is dependent, of course, upon the resultant monolithic structure. Since design techniques for determining the number and orientation of the layers of fiber reinforced resin composites is known to those familiar with the creation of such composites and since such design techniques are well known to those skilled in the art they are not described here.

The invention will now be described, by way of example, with reference to the accompanying drawing. A lay-up is formed of a partially impregnated prepreg or a stack of partially impregnated prepregs 6 on fiber glass reinforced TEFLON® brand polytetrafluoroethylene 4 on tool surface 2. Then, the partially impregnated prepreg or stack of partially impregnated prepregs 6 is covered with film 16 and glass cloth 18. Then, the partially impregnated prepreg or stack of partially impregnated prepregs 6 is positioned in contact with an evacuation conduit, such as one or more layers of breather tape 20. Rubber dams 10 and fiber glass tape 14 are placed at the edges of the partially impregnated prepreg or stack of partially impregnated prepregs 6 in order to prevent the edges of the resin film on the top and bottom faces from joining together under vacuum. The entire setup is enclosed in a vacuum envelope 22 with tacky tape 12 at the edges sealing the system. Next, air and other gases within the vacuum envelope are evacuated by opening valve 24 to create a vacuum. Once the vacuum is created in the vacuum envelope, air and other gases are evacuated and the contents of the vacuum envelope are heated. During the heating the partially impregnated resin infuses into inner areas of the reinforced and/or supporting fiber layers creating a fiber reinforced resin composite having very little, if any, porosity.

In a preferred embodiment the partially impregnated prepreg or stack of partially impregnated prepregs are enclosed in a resin content control envelope and the resin content control envelope is evacuated. This technique prevents resin bleed from the lay-up. Unpredictable lay-up resin bleed results in the production of fiber reinforced resin composites whose resin content and, thus, strength is unpredictable. Such composites are unsatisfactory in many environments, such as spacecraft, space vehicles and aircraft.

The positioning of the resin content control envelope inside of a vacuum envelope creates a double bag arrangement having a number of advantages that cannot be met by a single bag arrangement. One reason for the double bag arrangement is that conventional release films (TEFLON® brand polytetrafluoroethylene, for example) used for high temperature (above 250° F.) processing make poor vacuum bags because they are soft and, thus, subject to tearing when they contact a sharp object. Second, a double bag arrangement provides a way to vent the resin content control envelope at many points. Thus, many escape routes for air and volatiles are provided. If resin flow cuts off some routes, others remain. Third, the double bag arrangement creates a glove fit of the resin content control envelope around the lay-up in a way that avoids the need to use large amounts of breather tape to prevent resin from flowing into the vacuum line.

The invention is not limited to any particular type of resin. Rather, any resin composition which has modest tack and adequately flows through a fabric layer during impregnation and curing can be employed. A resin with modest tack adheres to the touch after pressure is applied, but separates easily. A non-tacky resin does not stick even with the application of pressure, while a tacky resin adheres to the touch and does not separate easily.

The preferred resins are storage stable. Preferably, the resins exhibit a minimum viscosity from about 100 poise to about 1200 poise at about 55° C. to about 75° C. More preferably the resins of the present invention have a minimum viscosity from about 100 poise to about 400 poise at about 55° C. to about 75° C. Most preferably the resins of the present invention have a minimum viscosity from about 100 poise to about 200 poise at about 60° C. to about 70° C.

The resin compositions of the present invention preferably possess certain additional theological characteristics. In one preferred embodiment the resin compositions are semi-solid at room temperature, i.e., 20–22° C., with modest tack. At ambient temperature the viscosity of the resin composition is such that it cannot flow and block the gas pathway in the prepreg before all of the volatiles can be removed while under vacuum. Additionally, if the resin composition exhibits high tack the prepreg may entrap volatiles and air. At an elevated cure temperature, generally on the order of about 55° C. to about 75° C. (although higher and lower cure temperatures can be utilized) the resins should be liquified and have a viscosity ranging from about 100 poise to 1200 poise in order to completely wet-out the fibers of the prepreg.

Resin types that are suitable for use include, but are not limited to, thermosetting resins and thermoplastic resins. Thermosetting resins include, but are not limited to, epoxy resins, bismaleimides (BMI), phenolics, cyanate esters, polyesters, polyimides and the like. In any event, the resin employed is preferably virtually free of entrained air and impurities that boil or foam under the vacuum/temperature/pressure conditions of a particular application of the invention. Mixtures of such resins may also be employed. In order to provide a resin composition with the desired balance of tack, viscosity and stability, resin mixtures are preferred. Conventional resin additives compatible with the desired properties of the resin may also be employed.

In general, epoxy resins and BMI resins are preferably employed. Particularly preferred epoxy resins have a minimum viscosity from about 100 poise to about 1200 poise at about 65° C. Particularly preferred BMI resins have a minimum viscosity from about 100 poise to about 400 poise at about 65° C.

Epoxy resins having the preferred rheological characteristics, i.e., a semi-solid state with modest tack at room temperature and a low viscosity liquid at curing temperatures on the order of 55° C.–75° C. are commercially available. Epoxy cresol novolac resins having such characteristics are preferred. For example, Table 1 shows a resin formulation in parts per hundred parts resin ("phr") ECN 9511, an epoxy cresol novolac resin commercially available from Ciba-Geigy, Hawthorne, N.Y., which is employed to partially impregnate a prepreg. ECN 9511 is a semi-solid resin at room temperature. Curimid-CN is an imidazole catalyst and is commercially available from Poly Organix, Newbury Port, Mass. Void-free laminates may be prepared at low pressure and temperature using this resin formulation.

TABLE 1

| Chemical Name | phr |
| --- | --- |
| ECN 9511 | 100 |
| Curimid-CN | 2 |

ECN 9511 has the following formula:

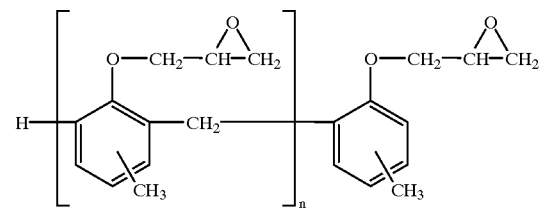

wherein n is 1.7

Combinations of semi-solid resins with liquid resins may also be used to prepare resin compositions having the desired rheological characteristics for use in the present invention. For example, the present invention includes a resin composition comprising:

(a) from about 70 to about 90 weight percent of a tris(hydroxyphenyl)methane based epoxy semi-solid resin; and (b) from about 10 to about 30 weight percent of a tetraglycidylmethylenedianiline liquid resin.

Table 2 shows a typical formulation employing a semi-solid resin with a liquid resin to form a resin composition having the desired rheological characteristics. TACTIX 742 is a semi-solid tris(hydroxyphenyl) methane based epoxy resin commercially available from Dow Chemical Company, Midland, Mich., and MY9612 is a liquid tetraglycidylmethylenedianiline resin which is commercially available from Ciba-Geigy, Hawthorne, N.Y.

TABLE 2

| Chemical Name | phr |
| --- | --- |
| TACTIX 742 | 80 |
| MY9612 | 20 |
| Curimid-CN | 2 |

TACTIX 742 has the following formula:

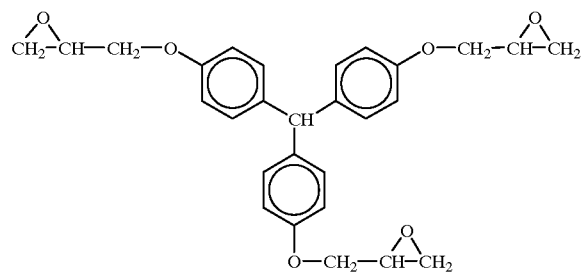

MY9612 has the following chemical formula:

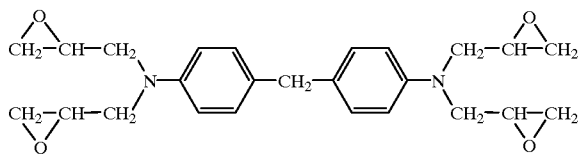

Combinations of solid resins, semi-solid resins and liquid resins can also be used to form a resin composition having the desired Theological characteristics. A preferred embodiment of such a resin composition comprises:

(a) from about 45 to about 65 weight percent of a glycidyl ether of phenolic novolac resin;

(b) from about 5 to about 20 weight percent of a bisphenol A epoxy semi-solid resin; and (c) from about 10 to about 30 weight percent of a bisphenol A epoxy liquid resin.

A typical example of a suitable mixture of a solid resin, a semi-solid resin and a liquid resin, respectively, is shown in Table 3.

TABLE 3

| Chemical Name | phr |
| --- | --- |
| DEN 438 | 58.2 |
| DER 331 | 13.8 |
| DER 661 | 22.9 |
| Curimid-CN | 2 |

DEN 438, a glycidyl ether of a phenolic novolac solid resin, DER 331, a bisphenol A epoxy semi-solid resin, and DER 661, a bisphenol A epoxy liquid resin, are all commercially available from the Dow Chemical Company, Midland, Mich.

DEN 438 has the following formula:

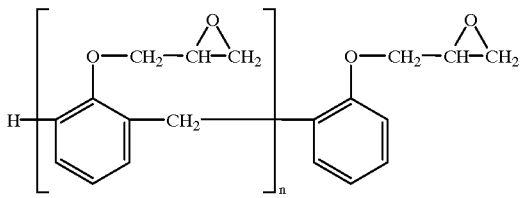

wherein n is 2.6.

DER 331 has the following formula:

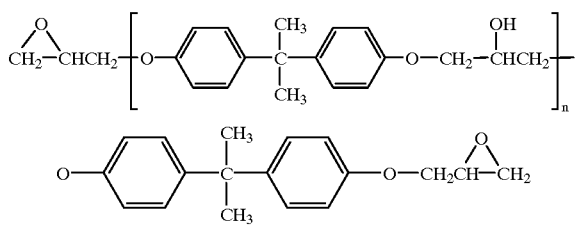

wherein n is 0.1.

DER 661 has the following formula:

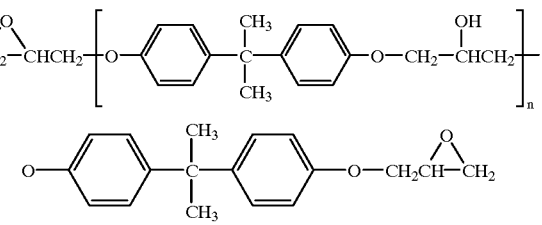

wherein n is 2.5.

Combinations of solid resins and liquid resins can also be used to form a resin composition having the desired rheological characteristics. A preferred embodiment of such a resin composition comprises:

(a) from about 20 to about 30 weight percent of a glycidyl ether of cresol novolac resin;

(b) from about 35 to about 45 weight percent of a tetraglycidylmethylenedianiline resin;

(c) from about 14 to about 26 weight percent of a bisphenol A epoxy liquid resin; and (d) from about 0 to about 8 weight percent of a bisphenol A epoxy solid resin.

A preferred example of a glycidyl ether of cresol novolac resin is DEN 439 having the following formula:

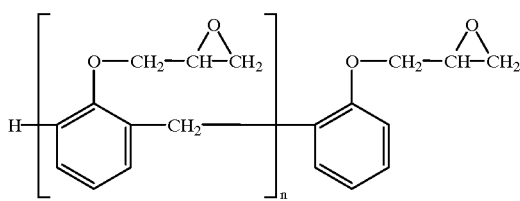

wherein n is 2.8. A preferred example of a tetraglycidylmethylenedianiline resin is MY9612. A preferred example of a bisphenol A epoxy liquid resin is DER 661. A preferred example of a bisphenol A epoxy solid resin is DER 669 having the following formula:

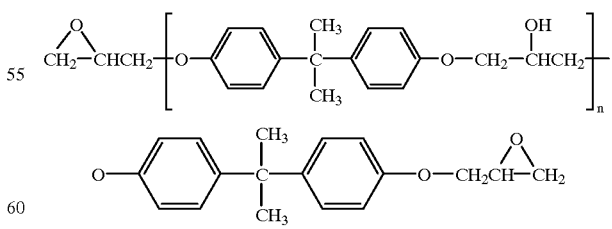

wherein n is 30.5.

In a preferred embodiment the resin composition comprises:

(a) about 25 weight percent of

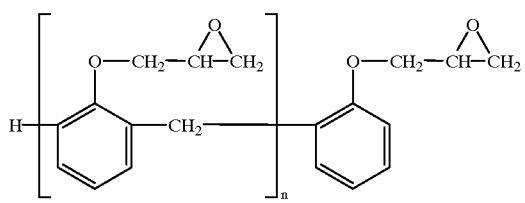

wherein n is 2.8;

(b) about 40 weight percent of

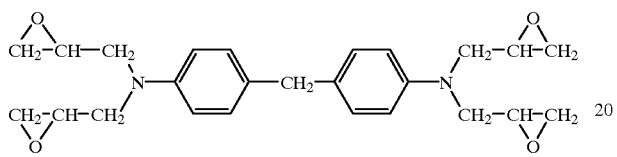

(c) about 18 weight percent of

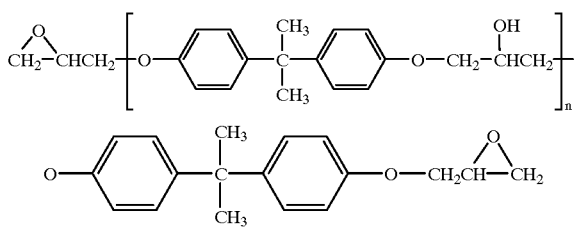

wherein n is 2.5; and (d) about 8 weight percent of

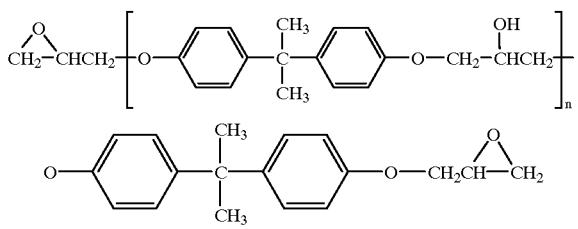

wherein n is 30.5.

In another preferred embodiment the resin composition comprises:

(a) about 24 weight percent of

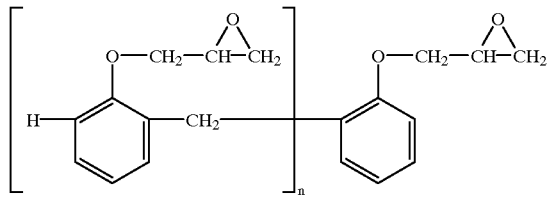

wherein n is 2.8;

(b) about 40 weight percent of

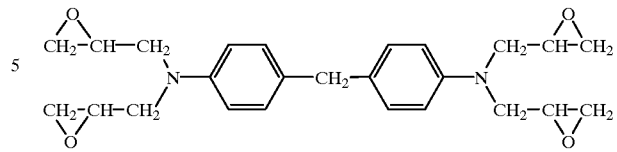

(c) about 22 weight percent of

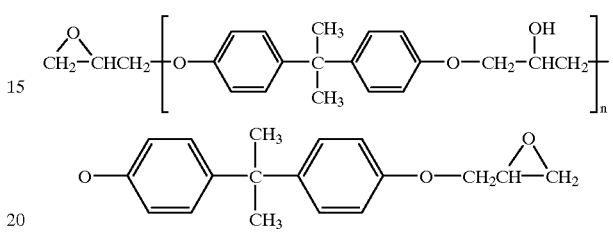

wherein n is 2.5; and (d) about 4 weight percent of

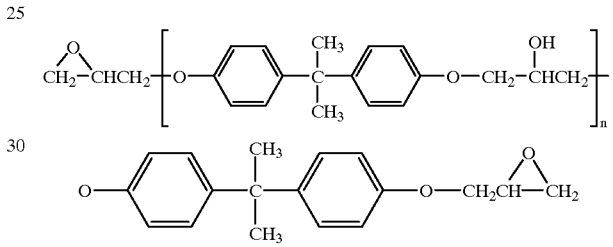

wherein n is 30.5.

The amount of each resin in the resin composition may be varied in broad amounts to achieve the objects of the present invention. In general, sufficient amounts of resin are employed to provide a resin composition which is semi-solid at room temperature and liquid at curing temperatures with the viscosity on the order of about 100 to 1200 poise.

It will be appreciated that in order to determine the appropriate resin loading in a partially impregnated prepreg one must take into account the bulk density of the fabric. The higher the bulk density of the fabric the lower the resin loading required. Accordingly, for most fabrics the amount of resin in the partially impregnated prepreg is preferably up to about 50 weight percent, more preferably from 25 weight percent to about 40 weight percent and most preferably from about 30 weight percent to 35 weight percent based on the total weight of the partially impregnated prepreg. Usually or generally, if the resin loading is less than 25 weight percent based on the total weight of the partially impregnated prepreg, the void content of the resulting laminate will increase and may not achieve the objectives of this invention. If it is not necessary that the laminate be essentially void-free then lower resin loadings, less than about 25 weight percent can be employed. If fabric of high bulk density is utilized or the void level of the composite material can be greater than, for example 2%, then the resin loading can be substantially less than 25 weight percent.

If resin is uniformly distributed throughout a prepreg, several disadvantages result. Firstly, entrapped air cannot escape from the prepregs used in the manufacture of composite materials. As a result of the entrapped air, the composite material will contain undesirable voids. Void formation seriously compromises the mechanical properties of the composite material and in many cases requires large repair costs due to rejection of parts before they can be employed. Secondly, when resin is distributed throughout a prepreg the resin within the prepreg does nothing to contribute to tack which may lead to complications in production. The disadvantages of prepregs having resin distributed throughout are met by the partially impregnated prepregs of the present invention. The partially impregnated prepregs provide for channels which facilitate the elimination of entrapped air from the prepreg thereby resulting in the formation of an essentially void-free composite material. Additionally, the partially impregnated prepregs allow more resin on the surface of the prepregs which improves the tack of low tack resins. Resin tack is very important for lay up purposes. For example, when the mold is a vertical surface the prepreg has to be able to stick to the surface and resist falling down due to gravity. Furthermore, a partially impregnated prepreg often improves the drape of the prepreg, i.e., its ability to conform to the mold. Improved drape facilitates easier lay up of the preform.

Curing agents suitable for use in the present invention are well known to those skilled in the art and will depend on the resin composition employed. For example, in the case of epoxy resins, curing agents that are suitable for use include, but are not limited to the following: about 2 phr to about 8 phr cyanoguanidine; about 15 phr to about 45 phr aromatic diamines; about 1 phr to about 30 phr amines; about 1 phr to about 5 phr imidazoles; about 2 phr to about 10 phr substituted ureas; about 1 phr to about 10 phr tertiary amines; about 30 phr to about 135 phr acid anhydrides; about 1 phr to about 5 phr Lewis acids such as BF3-MEA (boron trifluoride methylethylamine); about 10 phr to about 40 phr hydrazides; and combinations of the aforementioned curing agents. BMIs are generally catalyzed with about 0.05 phr to about 2 phr TPP (triphenylphosphine) or imidazole curing agents.

Preferred curing agents include, for example, from about 3 to about 5 weight percent of $H_2NC(=NH)NHCN$ based on the resin composition (dicyandiamide, also known as cyanoguanidine or dicyanodiamide) which is commercially available from Pacific Anchor Chemical Corporation, Los Angeles, Calif.

Another preferred curing agent is from about 1.5 to about 2.5 weight percent of toluene bisdimethyl urea, commercially available as CA 150 from Cytec Fiberite, Havre de Grace, Md., whose structure is as follows:

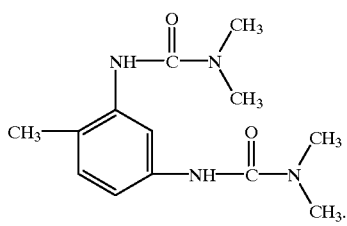

An additional preferred curing agent is from about 0.2 to about 0.5 weight percent of

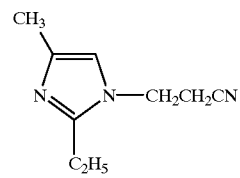

1-(2-cyanoethyl)-2-ethyl-4-methylimidazole, which is commercially available from Poly Organix, Newbury Port, Mass.

As will be readily appreciated from the foregoing description, the invention includes a new and improved method for creating void-free fiber reinforced resin composites ("void-free laminates"). Because the process uses a prepreg that is partially impregnated with resin to create a lay-up, difficulties associated with prior art lay-ups using preimpregnated fiber layers are avoided. More specifically, because the resins used in the partially impregnated prepreg at the cure temperature, are in liquid form and have a viscosity ranging from 100 poise to 1200 poise, they completely wet out the fibers of the prepreg. Further, because air and gases are evacuated from the partially impregnated prepreg as resin infuses into the layer(s) of the partially impregnated prepreg, a porous end product is avoided.

The viscosities of the resins of the present invention were measured using an Rheometrics rheometer (RDS-2) using parallel plates having a 1 millimeter gap at 65° C.–75° C., with the assumption that the resins had newtonian characteristics.

This invention will be better understood from the Examples which follow. However, one skilled in the art will readily appreciate that the specific methods and results discussed are merely illustrative of the invention and no limitation of the invention is implied.

EXAMPLE 1

PREPARATION OF MODIFIED EPOXY RESINS

Modified epoxy resins for partially impregnating prepregs were prepared according to the following procedure. The amounts of each of the components used to prepare the resin compositions are listed in Table 4. Resin composition A was successfully used to partially impregnate unidirectional tape prepregs and resin composition B was successfully used to partially impregnate cloth prepregs.

TABLE 4

| Chemical Name | Resin Composition A (phr) | Resin Composition B (phr) |
|---|---|---|
| DEN 439 | 24.92 | 24.92 |
| MY9612 | 41.54 | 41.54 |
| DER 661 | 18.69 | 22.85 |
| DER 669 | 8.31 | 4.15 |
| DICY | 4.15 | 4.15 |
| CA 150 | 2.08 | 2.08 |
| Curimid-CN | 0.31 | 0.31 |

All of the components for the resin compositions are commercially available: epoxy resins DEN 439 (a glycidyl ether of a phenolic novolac resin), DER 661 (a Bisphenol A epoxy liquid resin) and DER 669 (a Bisphenol A epoxy solid resin) from the Dow Chemical Company, Midland, Mich. and MY9612 from Ciba-Geigy, Hawthorne, N.Y.; urea catalyst CA 150 from Cytec Fiberite, Havre de Grace, Md.; imidazole catalyst Curimid-CN from Poly Organix, Newbury Port, Mass.; and DICY (dicyandiamide) from Pacific Anchor Chemical Corporation, Los Angeles, Calif.

GENERAL PROCEDURE FOR PREPARATION OF RESINS HAVING FORMULATIONS A AND B

A mixer (MYERS Engineering, Inc., Bell, Calif.) equipped with a mixing blade and a thermometer was warmed to 270° F. MY9612 was added to the mixer. Once the temperature of MY9612 reached 250° F. the mixing blade was turned on and DER 669 was added. The resulting mixture was stirred for 1 hour at 250+20° F. to allow all of the solid DER 669 dissolve. DER 661 at 250° F. was then added to the mixture. The mixture was stirred for approximately 30 minutes to allow the DER 661 to dissolve. DEN 439 was then added at 250° F. and mixed for 10 minutes. The temperature of the mixture was decreased to 180° F. DICY was then added and mixed for 10 minutes. The resin composition was then ready for use to partially impregnate prepregs.

EXAMPLE 2

Two unidirectional partially impregnated prepregs each measuring 61 centimeters by 61 centimeters were laid-up on a fiber reinforced teflon film. The film was on a tool surface in a vacuum-bag-only-pressure apparatus. Each prepreg comprised G30–500 carbon fibers (obtained from Toho, Japan) partially impregnated with the modified epoxy resins of EXAMPLE 1 (Resin Composition A). Each prepreg had an areal fiber weight of 145 g/m and a resin content of 36% by weight. The top and bottom face of each of the prepregs was impregnated.

The laid-up prepregs were debulked under an absolute pressure of ½ inch for 10 minutes at room temperature. Rubber dams and fiber glass tape were used to avoid pinch-off of the prepregs around the edge area. Following release of the vacuum another two prepregs were laid-up on the pair of debulked prepregs and the debulking process was repeated. This process of laying-up prepregs was repeated until 40 prepregs were laid-up having a configuration of $[0, 90]_{10S}$. This laid-up configuration is considered to be unfavorable for the production of a void-free laminate because the prepregs are in the least nested orientation.

On completion of the debulking of the laid-up prepregs, a FEP film, glass cloth, and polyester breather were placed over the top of the stack of prepregs in the vacuum envelope. The complete vacuum-bag-only-pressure apparatus was then placed in an air-circulating oven and the temperature was increased from room temperature to 65° C. at the rate of 1.7° C. per minute under an absolute pressure of ≦3 mmHg. The temperature was maintained at 65° C. for 14 hours in order to allow the prepregs to outgas, coalesce and gel. The temperature was then reduced to room temperature at the rate of 2.8° C. per minute before the vacuum was removed and the assembly dismantled to remove the laminate.

The laminate was post-cured by heating the laminate at the rate of 1.7° C. per minute to 177° C. This temperature was maintained for 2 hours. The temperature was then reduced to room temperature at the rate of 2.8° C. per minute. The resulting laminate was then subjected to a number of tests described below.

VOID PERFORMANCE EVALUATION

The void content of the cured laminate was examined using a C-scanner. A lead dot was used to calibrate the sensitivity of the C-scan signal. Upon examination of the C-scan the laminate was found to be void-free.

Void performance was also examined by taking a photomicrograph of the center area of the cured laminate. The laminate was cut and polished prior to examination. The photomicrography study confirmed the C-scan results that no voids were present in the laminate.

GLASS TRANSITION TEMPERATURE ("Tg")

Glass transition temperature was measured using a DuPont 983 Dynamic Mechanical Analyzer. Tg data reported in Table 5 is the onset temperature from the storage modulus curve. The temperature was increased at 10° C./min during testing.

TABLE 5

| Tg | Degrees (° C.) |
| --- | --- |
| Dry | 192 |
| Wet[1/] | 163 |

[1/]Exposed to boiling water for 48 hours.

EXAMPLE 3

COMPRESSION STRENGTH AFTER IMPACT TESTING ("CAI")

A laminate was prepared in accordance with EXAMPLE 2, with the following configuration $[45, 0, -45, 90]_{4S}$. A Dynatup Model 8200 (Dynatup, Santa Barbara, Calif.) instrumented impact machine equipped with a 1.58 cm diameter hemispherical tip impactor weighing 5.155 Kg was set at a height to achieve a target impact energy level of 6.675 KJ/m (1,500 in-lb/in) of thickness.

The laminate was prepared for testing in accordance with SACMA SRM2R-94 and placed on a steel impact support base. The tip of the impactor was allowed to hit the laminate once.

Following completion of the impact testing, the laminate was assembled in a compression test fixture in accordance with SACMA SRM2R-94 to determined the compressive strength after impact testing. The results for the compression after impact testing are presented in Table 6.

TABLE 6

| Impact Energy | MPa |
| --- | --- |
| 6.675 KJ/m | 126.9 |

EXAMPLE 4

SHORT BEAM SHEAR TEST ("SBS")

A laminate was prepared in accordance with EXAMPLE 2 having the configuration $[0]_{16}$. A three-point loading test fixture with 0.633 cm diameter loading nose and 0.316 cm diameter support noses in accordance with ASTM D2344 was used in the test. Laminate size was 2.53 cm ×0.633 cm (1"×0.25") with span of 4:1 laminate thickness. The results for the short beam shear test are presented in Table 7.

TABLE 7

| Temperature | MPa |
| --- | --- |
| Room Temperature | 119.3 |
| 121° C. (Dry) | 74.5 |
| 121° C. (Wet[2/]) | 55.2 |

[2/]Exposed to boiling water for 24 hours.

EXAMPLE 5

0° COMPRESSION STRENGTH TEST

A laminate was prepared in accordance with EXAMPLE 2 and had the following configuration $[0]_3$. A 0° compression strength test was performed on the laminate in accordance with ASTM D695. Tabs were used to hold the laminate in place for testing. The tabs were bonded to the laminate using Metalbound™ 1515 adhesive. The results for the 0° compression strength test are presented in Table 8.

TABLE 8

| Temperature | GPa |
| --- | --- |
| Room Temperature | 1.631 |
| 121° C. (Dry) | 1.532 |

EXAMPLE 6

The method in EXAMPLE 2 was repeated with the modification that woven cloth prepregs were substituted for the unidirectional tape prepregs. Each of the prepregs comprised G30-500-5SH-6K woven material (obtained from Toho, Japan) partially impregnated with the modified epoxy resin from EXAMPLE 1 (Resin Composition B). Each prepreg had an areal fiber weight of 373 g/m and a resin content of 40% by weight. The void content of the cured laminate was examined according to the methods described in Example 2 and no voids were present.

Additional tests as described in EXAMPLES 2–5 were performed on a laminate having configuration [0, 45, 0, 45, 0]$_s$ unless otherwise indicated. The laminate used in the SBS test had laid-up configuration $[0]_8$. The laminate used for the 0° compression test had laid-up configuration $[0]_8$. The laminate for the CAI test had laid-up configuration $[45, 0]_{3S}$. The results of the testing are shown in Table 9.

TABLE 9

| Test | Result |
| --- | --- |
| Tg (Dry) | 192° C. |
| Tg (Wet) | 166° C. |
| SBS at room temperature | 72.4 MPa |
| SBS at 121° C. (Dry) | 54.5 MPa |
| SBS at 121° C. (Wet) | 42.1 MPa |
| 0° Compression Strength at room temperature | 0.674 GPa |

TABLE 9-continued

| Test | Result |
| --- | --- |
| 0° Compression at room temperature | 0.606 GPa |
| CAI | 161 MPa |

EXAMPLE 8

Carbon fiber cloth prepregs were partially impregnated with resin compositions from Tables 1–4. The partially impregnated prepregs were treated in the same manner as those of EXAMPLE 2 to form a void-free laminate. On examination using C-scan and cross-section photomicrography the laminates were found to have less than 1 percent voids present.

EXAMPLE 9

Unidirectional tapes were partially impregnated with the resin compositions from Tables 1–4. The partially impregnated prepregs were treated in the same manner as those of EXAMPLE 2 to form a void-free laminate. On examination using C-scan and cross-section photomicrography the laminates were found to have less than 1 percent voids present.

EXAMPLE 10

OUT-LIFE OF MODIFIED EPOXY RESIN

A laminate was prepared according to EXAMPLE 2 having lay up configuration of $[0, 90]_{10S}$ using partially impregnated prepregs which had been stored at room temperature ($\leq 24°$ C.) for ten days. Low temperature curable partially impregnated prepregs normally do not have a long out-life. Partially impregnated prepregs are known to lose tack and resin viscosity increases over time. Accordingly, a resin with a high viscosity may not be able to completely wet-out fibers at low cure temperatures which may result in the occurrence of voids. On examination of the laminate according to the methods described in EXAMPLE 2 no voids were present. EXAMPLE 11

STABILITY OF EPOXY MODIFIED RESIN

The stability of the epoxy modified resin composition from Example 1 (Resin Composition B) at 65° C. was studied using a rheological analyzer. The viscosity for the resin at 65° C. less than doubled after the resin had been staged for 11 days at room temperature.

EXAMPLE 12

COMPARISON OF CAI VALUES FOR AUTOCLAVE-CURED LAMINATES TO NON-AUTOCLAVE-CURED LAMINATES.

Laminates were prepared according to EXAMPLES 2 and 6. The CAI value of the laminates were measured side by side with a typical 177° C. autoclaved cured epoxy/carbon fiber prepreg system, Cycom®5239–1 (commercially available from CytecFiberite, Anaheim, Calif.). The Cycom®5239–1 laminates were processed using 0.586 MPa (85 psi) pressure. Under identical testing conditions, the laminates prepared according to EXAMPLES 2 and 6, i.e., vacuum-bag-pressure-only, had CAI values very similar to that of the autoclave-cured laminate.

Other objects, advantages, features and modifications of this invention will be apparent to those of ordinary skill in this art. This invention is not to be limited except as set forth in the claims which follow.

What is claimed is:

1. A partially impregnated prepreg comprising a fiber layer partially impregnated with a resin composition such that a portion of the fiber layer is not initially contacted with the resin composition, said resin composition being a semi-solid at room temperature and having reduced viscosity at a cure temperature greater than room temperature such that when heated in a vacuum envelope in the absence of autoclave pressure, the resin flows and fully infuses into said fiber layer and cures to form a void-free laminate.

2. The partially impregnated prepreg of claim 1, wherein said fiber layer is formed of a plurality of parallel oriented tows, each tow formed of a plurality of unidirectional reinforcement fibers.

3. The partially impregnated prepreg of claim 2, wherein said plurality of unidirectional reinforcement fibers are selected from the group consisting of glass, quartz, organics, carbon and graphite.

4. The partially impregnated prepreg of claim 1, wherein said resin composition is partially impregnated on one face of said fiber layer.

5. The partially impregnated prepreg of claim 1, wherein said resin composition is partially impregnated on both faces of said fiber layer.

6. The partially impregnated prepreg of claim 1, wherein said resin composition is in a form selected from the group consisting of a film, a powder and a liquid.

7. The partially impregnated prepreg of claim 6, wherein said resin composition has a viscosity between 100 poise and 1200 poise at the cure temperature.

8. The partially impregnated prepreg of claim 1, wherein said resin is a liquid at the cure temperature with a viscosity between 100 poise and 1200 poise.

9. The partially impregnated prepreg of claim 1, wherein said heating is at a temperature of 55° C. to 75° C. to cure said resin.

10. The partially impregnated prepreg of claim 9, wherein said heating is at a temperature of 65° C. to cure said resin.

11. The partially impregnated prepreg of claim 1, wherein said void-free laminate is post-cured by heating said laminate to a temperature of 175° C. to 185° C.

12. The partially impregnated prepreg of claim 1, wherein said void-free laminate is a material for an aircraft or spacecraft.

13. The partially impregnated prepreg of claim 1, wherein said fiber layer is a woven fabric.

14. The partially impregnated prepreg of claim 13, wherein said woven fabric comprises fibers selected from the group consisting of glass, quartz, organics, carbon and graphite.

* * * * *